(12) United States Patent
Zobel et al.

(10) Patent No.: US 6,767,944 B2
(45) Date of Patent: Jul. 27, 2004

(54) FLAME-RESISTANT POLYCARBONATE COMPOSITIONS HAVING INCREASED CHEMICAL RESISTANCE

(75) Inventors: Michael Zobel, Köln (DE); Andreas Seidel, Dormagen (DE); Thomas Eckel, Dormagen (DE); Torsten Derr, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 4 days.

(21) Appl. No.: 10/079,980

(22) Filed: Feb. 21, 2002

(65) Prior Publication Data

US 2002/0161078 A1 Oct. 31, 2002

(30) Foreign Application Priority Data

Feb. 26, 2001 (DE) .......................... 101 09 224

(51) Int. Cl.$^7$ ............................ C08K 5/52; C08K 5/05; C08K 3/34
(52) U.S. Cl. .................. 524/127; 524/369; 524/451
(58) Field of Search ............................... 534/127, 451, 534/369

(56) References Cited

U.S. PATENT DOCUMENTS

| | | | |
|---|---|---|---|
| 4,629,760 A | 12/1986 | Liu et al. | 525/67 |
| 5,157,065 A | 10/1992 | Fuhr et al. | 524/141 |
| 5,204,394 A | 4/1993 | Gosens et al. | 524/125 |
| 5,672,645 A | 9/1997 | Eckel et al. | 524/127 |
| 5,969,016 A | 10/1999 | Weber et al. | 524/127 |
| 6,441,068 B1 * | 8/2002 | Eckel et al. | 524/127 |

FOREIGN PATENT DOCUMENTS

| | | |
|---|---|---|
| DE | 198 53 105 | 5/2000 |
| WO | 99/07782 | 2/1999 |

* cited by examiner

*Primary Examiner*—Kriellion A. Sanders
(74) *Attorney, Agent, or Firm*—Joseph C. Gil; Aron Preis

(57) ABSTRACT

A flame retardant, chemical and impact resistant, thermoplastic molding composition is disclosed. The composition that contains (A) an aromatic polycarbonate and/or polyester carbonate,
(B) a graft polymer,
(C) an oligophosphate conforming to a specific formulaEINBETTEN,
(D) an anti-drip agent, and
(E) a polyhydroxy ether is suitable for preparing molded articles.

24 Claims, No Drawings

FLAME-RESISTANT POLYCARBONATE COMPOSITIONS HAVING INCREASED CHEMICAL RESISTANCE

FIELD OF THE INVENTION

The present invention relates to thermoplastic molding compositions and more particularly to flame-resistant and impact-resistant polycarbonate compositions with increased chemical resistance and to molded articles produced therefrom.

SUMMARY OF THE INVENTION

A flame retardant, chemical and impact resistant, thermoplastic molding composition is disclosed. The composition that contains (A) an aromatic polycarbonate and/or polyester carbonate, (B) a graft polymer, (C) an oligophosphate conforming to a specific formula, (D) an anti-drip agent, and (E) a polyhydroxy ether is suitable for preparing molded articles.

BACKGROUND OF THE INVENTION

Mixtures containing polycarbonates, graft copolymers such as ABS as well as copolymers based on styrene are used for many applications, for example in the automobile, electrical and data technology areas, or in the domestic appliances or sports sector. For many areas of application the plastics materials are rendered flame-resistant. In specific applications, in particular in areas in which the plastics materials come into direct contact with chemicals such as solvents, greases, oils, acids or cleaning agents, it is also necessary that these plastics materials exhibit, apart from an outstanding flame resistance behavior, also an excellent stress crack resistance (i.e. a good ESC behavior). This is the case for example with housing parts of office equipment and kitchen appliances, which are often exposed to the effect of greases and oils or solvents containing the latter. The plastics materials used for these purposes have to satisfy certain fire safety regulations. For example, for specific thin-wall applications it is necessary that the housing parts rate "V0" in the flame resistance test according to UL94 V with wall thicknesses of less than 1.6 mm.

In order to influence specifically the flame resistance as well as the mechanical and rheological properties of polycarbonate compositions, certain auxiliary substances such as flame-proofing agents, plasticizers or inorganic materials are added to the compositions. The individual auxiliary substances often influence several properties of the material in opposite ways. For example, the improvement in the flowability of a polycarbonate molding composition achieved by adding plasticizers is as a rule offset by a deterioration in the thermal stability, measured for example according to Vicat B. It has therefore proved difficult to produce suitable polycarbonate compositions having a balanced property spectrum.

Flame-resistant polycarbonate/ABS compositions are known from numerous applications. For example, U.S. Pat. Nos. 5,157,065, 5,204,394 and 5,672,645 describe flame-resistant polycarbonate/ABS molding compositions that contain organic phosphorus compounds such as monophosphoric acid esters, oligophosphoric acid esters or mixtures thereof as flame-proofing agents, as well as fluorinated polyolefins as anti-drip agents. The molding compositions described in these specifications achieve a rating of V0 in the UL94 V fire test with a wall thickness of 1.6 mm. For many applications, such as for example certain thin-walled housing parts, this classification is often insufficient. In this case a V0 rating is increasingly required even with wall thicknesses of less than 1.6 mm, combined at the same time with good mechanical and rheological properties as well as excellent chemical resistance.

WO 99/07782 discloses flame-proofed polycarbonate/ABS molding compositions containing an oligomeric phosphoric acid ester compound based on bisphenol A and an extremely finely divided inorganic compound. The described molding compositions are characterized by improved mechanical properties (notch impact strength, stress crack behavior) combined with good thermal stability. The disadvantage of these molding compositions, however, is that they have an insufficient flame resistance for wall thicknesses of less than 1.6 mm, as is required for thin-wall applications.

In EP-A 0 780 438 it is proposed, in order to improve the flame resistance, toughness and flowability of polycarbonate/ABS molding compositions, to add to the latter in addition to a halogen-free phosphorus compound as flame-proofing agent, also a polyhydroxy ether as flame-proofing synergist. Monomeric organophosphoric acid esters or oligomeric organophosphoric acid esters derived from resorcinol and hydroquinone are preferably used as phosphorus compound. The described molding compositions are characterized by an improved flowability and impact strength as well as a low tendency to crack formation under impact stress. From the examples it can be seen that with the produced polycarbonate/ABS molding compositions, although the afterburn times in the UL94 V test with a wall thickness of 1.7 mm are in fact measurably reduced by the addition of the polyhydroxy ether, nevertheless the rating V0 is not achieved with times of more than 50 seconds. A further disadvantage of the described molding compositions is that they have an insufficient resistance to solvents (ESC behavior).

Finally, in U.S. Pat. No. 5,849,827 polycarbonate/ABS molding compositions that have been made flame resistant are described, in which a reduction in the afterburn time is achieved by adding small amounts of an inorganic powder in nano-divided form.

The disadvantage of the flame-resistant polycarbonate/ABS compositions known in the prior art is that they either have too low a flame resistance with thin wall thicknesses, or even if they have been rendered sufficiently flame-resistant they have insufficient mechanical and/or rheological properties such as flowability and/or too low a thermal stability. In particular it has proved extremely difficult to produce sufficiently flame-proofed polycarbonate/ABS compositions that in addition to a good flowability, toughness and thermal stability also exhibit a sufficient resistance to solvents (i.e. a good ESC behavior).

The object of the invention is to provide a flame-proofed polycarbonate composition having a significantly improved ESC behavior combined with good toughness, high thermal stability and good processing behavior. The polycarbonate compositions should achieve a rating of V0 in the UL94 V flame resistance test even with wall thicknesses of less than 1.6 mm. They should be characterized by a good flowability, and when processed by injection molding should not lead to undesirable deposits on the mold due to bleeding of the flame-proofing additive, i.e. so-called "juicing".

DETAILED DESCRIPTION OF THE INVENTION

This object is achieved according to the invention by a thermoplastic polymeric molding composition containing (A) at least one aromatic polycarbonate and/or polyester carbonate, (B) at least one graft polymer, (C) at least one oligophosphate of the general formula

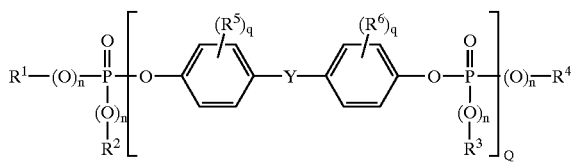

in which the radicals $R^1$, $R^2$, $R^3$ and $R^4$ independently of one another denote $C_1$ to $C_8$ alkyl optionally substituted by halogen, $C_5$ to $C_6$ cycloalkyl, $C_6$ to $C_{10}$ aryl or $C_7$ to $C_{12}$ aralkyl in each case optionally substituted by halogen and/or alkyl, n independently of one another is 0 or 1, q independently of one another is 0, 1, 2, 3 or 4, Q is 0.5 to 30, $R^5$ and $R^6$ independently of one another denote $C_1$ to $C_4$ alkyl or halogen, and Y denotes $C_1$ to $C_7$ alkylidene, $C_1$ to $C_7$ alkylene, $C_5$ to $C_{12}$ cycloalkylene, $C_5$ to $C_{12}$ cycloalkylidene, —O—, —S—, —SO—, —SO$_2$— or —CO—, (D) anti-drip agent and (E) at least one polyhydroxy ether, preferably a polyhydroxy of the type that can be obtained by reacting at least one aliphatic or aromatic diol with an epihalogen hydrin.

Depending on the intended property spectrum of the polymer composition, the polymer composition according to the invention may furthermore contain, inter alia:

(F) thermoplastic vinyl (co)polymers and/or polyalkylene terephthalates, (G) very finely divided inorganic powders, and/or (H) further conventional additives.

It has surprisingly been found that an excellent ESC behavior combined at the same time with good processing properties is achieved by the simultaneous presence of polyhydroxy ether E and the specific phosphorus compound C in the polycarbonate composition. It has furthermore surprisingly been found that the ESC behavior of analogous compounds is significantly worse when using other phosphorus compounds such as are employed in EP-A 0 780 438, e.g. triphenyl phosphate (TPP) or resorcinol oligophosphate (RDP). With test bodies produced from the polycarbonate compositions according to the invention V0 ratings are achieved in the UL94 V test at 1.5 mm and even at 1.2 mm. At the same time the polycarbonate compositions according to the invention have a considerably improved resistance to toluene/isopropanol mixtures under stress, with the result that they are for example suitable for the production of flame-resistant, thin-wall molded parts that have to satisfy stringent requirements as regards the ESC behavior.

The components used in the polymer composition according to the invention are described in more detail hereinafter:

Component A

Suitable aromatic polycarbonates and/or aromatic polyester carbonates of component A according to the invention are known in the literature or may be produced by methods known in the literature (for the production of aromatic polycarbonates see for example Schnell, "Chemistry and Physics of Polycarbonates", Interscience Publishers, 1964, as well as DE-AS 1 495 626, DE-OS 2 232 877, DE-A 2 703 376, DE-A 2 714 544, DE-A 3 000 610, DE-A 3 832 396; for the production of aromatic polyester carbonates see for example DE-A 3 077 934).

The production of aromatic polycarbonates may be carried out for example by reacting diphenols with carbonic acid halides, preferably phosgene and/or with aromatic dicarboxylic acid dihalides, preferably benzenedicarboxylic acid dihalides, by the phase boundary process, optionally with the use of chain terminators, for example monophenols, and optionally with the use of trifunctional or more than trifunctional branching agents, for example triphenols or tetraphenols.

Diphenols for the production of the aromatic polycarbonates and/or aromatic polyester carbonates are preferably those of the formula (I)

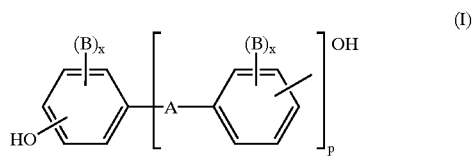

wherein

A denotes a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, which may be condensed with further aromatic rings optionally containing heteroatoms, or a radical of the formula (II) or (III)

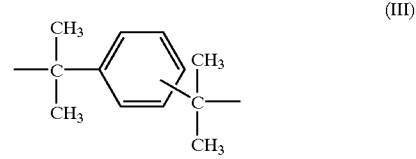

B in each case denotes $C_1$ to $C_{12}$ alkyl, preferably methyl, or halogen, preferably chlorine and/or bromine x in each case independently of one another denotes 0, 1 or 2, p is 0 or 1, and $R^5$ and $R^6$ are selected individually for each $X^1$, and independently of one another denote hydrogen or $C_1$ to $C_6$ alkyl, preferably hydrogen, methyl or ethyl, $X^1$ denotes carbon, and m is an integer from 4 to 7, preferably 4 or 5, with the proviso that on at least one atom $X^1$, $R^5$ and $R^6$ are both simultaneously alkyl.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones, and α,α-bis-(hydroxyphenyl)-diisopropylbenzenes as well as their nuclear-brominated and/or nuclear-chlorinated derivatives.

Particularly preferred diphenols are 4,4'-dihydroxydiphenyl, bisphenol A, 2,4-bis(4-hydroxyphenyl)-2-methylbutane, 1,1-bis(4-hydroxyphenyl)-cyclohexane, 1,1-bis(4-hydroxyphenyl)-3,3,5-trimethylcyclohexane, 4,4'-dihydroxydiphenyl sulfide, 4,4'-dihydroxydiphenyl sulfone as well as their dibrominated and tetrabrominated or chlorinated derivatives, such as for example 2,2-bis-(3-chloro-4-hydroxyphenyl)propane, 2,2-bis-(3,5-dichloro-4-hydroxyphenyl)propane or 2,2-bis-(3,5-dibromo-4-hydroxyphenyl)propane.

2,2-bis-(4-hydroxyphenyl)propane (bisphenol A) is particularly preferred.

The diphenols may be used individually or as arbitrary mixtures.

The diphenols are known in the literature or may be obtained by processes known in the literature.

Suitable chain terminators for the production of the thermoplastic, aromatic polycarbonates include for example phenol, p-chlorophenol, p-tert.-butylphenol or 2,4,6-tribromophenol, as well as long-chain alkylphenols such as 4-(1,3-tetramethylbutyl)phenol according to DE-OS 2 842 005, or monoalkylphenols or dialkylphenols with a total of 8 to 20 C atoms in the alkyl substituents, such as 3,5-di-tert.-butylphenol, p-iso-octylphenol, p-tert.-octylphenol, p-dodecylphenol, and 2-(3,5-dimethylheptyl)phenol and 4-(3,5-dimethylheptyl)phenol. The amount of chain terminators used is generally between 0.5 mole % and 10 mole %, referred to the molar sum of the diphenols used in each case.

The thermoplastic aromatic polycarbonates have mean, weight average molecular weights ($M_w$, measured for example by ultracentrifugation or light-scattering measurements) of 10,000 to 200,000, preferably 15,000 to 80,000.

The thermoplastic, aromatic polycarbonates may be branched in a manner known per se, and more specifically preferably by the incorporation of 0.05 to 2.0 mole %, referred to the sum of the diphenols used, of trifunctional or higher functional compounds, for example those with three or more phenolic groups.

Both homopolycarbonates as well as copolycarbonates are suitable. For the production of copolycarbonates according to the invention, as component A there may also be used 1 to 25 wt. %, preferably 2.5 to 25 wt. % (referred to the total amount of diphenols used) of polydiorganosiloxanes with hydroxy-aryloxy terminal groups. These are known (U.S. Pat. No. 3,419,634) and may be produced by methods known in the literature. The production of polydiorganosiloxane-containing copolycarbonates is described in DE-A 3 334 782.

Preferred polycarbonates include, in addition to bisphenol A homopolycarbonates, also the copolycarbonates of bisphenol A with up to 15 mole %, referred to the molar sums of diphenols, of diphenols other than preferred and/or particularly preferred diphenols, especially up to 15 mole % of 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenylether-4,4'-dicarboxylic acid and naphthalene-2,6-dicarboxylic acid.

Particularly preferred are mixtures of the diacid dichlorides of isophthalic acid and terephthalic acid in a ratio of between 1:20 and 20:1.

In the production of polyester carbonates a carbonic acid halide, preferably phosgene, is in addition co-used as bifunctional acid derivative.

Suitable chain terminators for the production of the aromatic polyester carbonates include, apart from the already mentioned monophenols, also their chlorinated carbonic acid esters as well as the acid chlorides of aromatic monocarboxylic acids, which may optionally be substituted by $C_1$–$C_{22}$ alkyl groups or by halogen atoms, as well as aliphatic $C_2$–$C_{22}$ monocarboxylic acid chlorides.

The amount of chain terminators is in each case 0.1 to 10 mole %, referred in the case of phenolic chain terminators to moles of diphenol, and in the case of monocarboxylic acid chloride chain terminators to moles of dicarboxylic acid dichlorides.

The aromatic polyester carbonates may also include incorporated aromatic hydroxycarboxylic acids.

The aromatic polyester carbonates may be linear as well as branched in a manner known per se (see in this connection DE-A 2 940 024 and DE-A 3 007 934).

As branching agents there may be used for example trifunctional or polyfunctional carboxylic acid chlorides such as trimesic acid trichloride, cyanuric acid trichloride, 3,3'-4,4'-benzophenone tetracarboxylic acid tetrachloride, 1,4,5,8-naphthalene-tetracarboxylic acid tetrachloride or pyromellitic acid tetrachloride in amounts of 0.01 to 1.0 mole %, referred to the dicarboxylic acid dichlorides that are used, or trifunctional or higher functional phenols such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methylphenol, 2-(4-hydroxyphenyl)-2-(2,4-dihydroxyphenyl)-propane, tetra-(4-[4-hydroxyphenylisopropyl]-phenoxy)-methane, 1,4-bis-[4,4'-dihydroxytriphenyl)-methyl]-benzene, in amounts of 0.01 to 1.0 mole %, referred to the diphenols that are used. Phenolic branching agents may be added together with the diphenols, while acid chloride branching agents may be added together with the acid dichlorides.

In the thermoplastic, aromatic polyester carbonates the proportion of carbonate structural units may be varied as desired. Preferably the proportion of carbonate groups is up to 100 mole %, in particular up to 80 mole %, particularly preferably up to 50 mole %, referred to the sum total of ester groups and carbonate groups. The ester fraction as well as the carbonate fraction of the aromatic polyester carbonates may be present in the form of blocks or may be statistically distributed in the polycondensate.

The relative solution viscosity ($\eta_{rel.}$) of the aromatic polycarbonates and polyester carbonates is in the range 1.18 to 1.4, preferably 1.20 to 1.32 (measured in solutions containing 0.5 g of polycarbonate or polyester carbonate in 100 ml of methylene chloride solution at 25° C).

The thermoplastic, aromatic polycarbonates and polyester carbonates may be used alone or in arbitrary mixtures with one another.

The component A may be contained in the composition according to the invention in an amount of preferably 5 to 98.9 wt. %, particularly preferably 10 to 90 wt. % and most particularly preferably 40 to 80 wt. %, referred to the weight of the composition.

Component B

The component B comprises one or more graft polymers of

B.1 5 to 95 wt. %, preferably 30 to 90 wt. %, of at least one vinyl monomer on

B.2 95 to 5 wt. %, preferably 70 to 10 wt. %, of one or more graft bases having glass transition temperatures of <10° C., preferably <0° C., particularly preferably <−20° C.

The graft base B.2 generally has a mean particle size ($d_{50}$ value) of 0.05 to 10 µm, preferably 0.1 to 8 µm, particularly preferably 0.2 to 5 µm.

Monomers B.1 are preferably mixtures of

B.1.1 50 to 99 parts by weight of vinyl aromatic compounds and/or nuclear-substituted vinyl aromatic compounds (such as for example styrene, α-methylstyrene, p-methylstyrene, p-chlorostyrene) and/or methacrylic acid ($C_1$–$C_8$) alkyl esters (such as methyl methacrylate, ethyl methacrylate), and B.1.2 1 to 50 parts by weight of vinyl cyanides (unsaturated nitriles such as acrylonitrile and methacrylonitrile) and/or (meth)acrylic acid ($C_1$–$C_8$) alkyl esters (such as methyl methacrylate, n-butyl acrylate, t-butyl acrylate) and/or derivatives (such as anhydrides and imides) of unsaturated carboxylic acids (for example maleic anhydride and N-phenylmaleimide).

Preferred monomers B.1.1 are selected from at least one of the monomers styrene, α-methylstyrene and methyl methacrylate, and preferred monomers B.1.2 are selected from at least one of the monomers acrylonitrile, maleic anhydride and methyl methacrylate.

Particularly preferred monomers are B.1.1 styrene, and B.1.2 acrylonitrile.

Suitable graft bases B.2 for the graft polymers B are for example diene rubbers, EP(D)M rubbers, i.e. those based on ethylene/propylene, and optionally diene, acrylate, polyurethane, silicone, chloroprene and ethylene/vinyl acetate rubbers.

Preferred graft bases B.2 are diene rubbers (for example based on butadiene, isoprene, etc.) or mixtures of diene rubbers or copolymers of diene rubbers or their mixtures with further copolymerizable monomers (for example according to B.1.1 and B.1.2), with the proviso that the glass transition temperature of the component B.2 is below 10° C., preferably <0° C., particularly preferably <−10° C.

Pure polybutadiene rubber is particularly preferred.

Particularly preferred polymers B are for example ABS polymers (emulsion, bulk and suspension ABS), such as are described for example in DE-A 2 035 390 (=U.S. Pat. No. 3,644,574) or in DE-A 2 248 242 (=GB-PS 1 409 275) or in Ullmann, Enzyklopädie der Technischen Chemie, Vol.19 (1980), p.280 if. The gel proportion of the graft base B.2 is at least 30 wt. %, preferably at least 40 wt. % (measured in toluene).

The graft copolymers B are produced by free-radical polymerization, for example by emulsion, suspension, solution or bulk polymerization, preferably by emulsion or bulk polymerization. ABS produced by bulk polymerization is particularly preferred.

Particularly suitable graft rubbers are also ABS polymers that are produced by redox initiation with an initiator system of organic hydroperoxide and ascorbic acid according to U.S. Pat. No. 4,937,285.

Since in the graft reaction the graft monomers are as is known not necessarily completely grafted onto the graft base, according to the invention the term graft polymers B is also understood to mean those products that are obtained by (co)polymerization of the graft monomers in the presence of the graft base and that are formed with the latter during the working-up.

Suitable acrylate rubbers according to B.2 of the polymers B are preferably polymers of acrylic acid alkyl esters, optionally with up to 40 wt. %, referred to B.2, of other polymerizable, ethylenically unsaturated monomers. The preferred polymerizable acrylic acid esters include $C_1$–$C_8$ alkyl esters, for example methyl, ethyl, butyl, n-octyl and 2-ethylhexyl esters; halogenated alkyl esters, preferably halogenated-$C_1$–$C_8$-alkyl esters such as chloroethyl acrylate, as well as mixtures of these monomers.

Monomers with more than one polymerizable double bond may be co-polymerized for the crosslinking. Preferred examples of crosslinking monomers are esters of unsaturated monocarboxylic acids with 3 to 8 C atoms and unsaturated monohydric alcohols with 3 to 12 C atoms or saturated polyols with 2 to 4 OH groups and 2 to 20 C atoms, such as ethylene glycol dimethacrylate, allyl methacrylate; multiply unsaturated heterocyclic compounds such as trivinyl cyanurate and triallyl cyanurate; polyfunctional vinyl compounds such as divinylbenzene and trivinylbenzene; as well as triallyl phosphate and diallyl phthalate.

Preferred crosslinking monomers include allyl methacrylate, ethylene glycol dimethacrylate, diallyl phthalate and heterocyclic compounds that contain at least 3 ethylenically unsaturated groups.

Particularly preferred crosslinking monomers are the cyclic monomers triallyl cyanurate, triallyl isocyanurate, triacryloylhexahydro-s-triazine, and triallylbenzenes. The amount of the crosslinking monomers is preferably 0.02 to 5 wt. %, in particular 0.05 to 2 wt. %, referred to the graft base B.2.

In the case of cyclic crosslinking monomers containing at least 3 ethylenically unsaturated groups, it is advantageous to restrict the amount to below 1 wt. % of the graft base B.2.

Preferably "other" polymerizable ethylenically unsaturated monomers that in addition to the acrylic acid esters may optionally serve for the production of the graft base B.2 include for example acrylonitrile, styrene, α-methylstyrene, acrylamides, vinyl $C_1$–$C_6$ alkyl ethers, methyl methacrylate, and butadiene. Preferred acrylate rubbers as graft base B.2 are emulsion polymers that have a gel content of at least 60 wt. %.

Further suitable graft bases according to B.2 are silicone rubbers with graft-active sites, such as are described in DE-A 3 704 657, DE-A 3 704 655, DE-A 3 631 540 and DE-A 3 631 539.

The gel content of the graft base B.2 is measured at 25° C. in a suitable solvent (M. Hoffmann, H. Krömer, R. Kuhn, Polymeranalysis I and II, Georg Thieme-Verlag, Stuttgart 1977).

The mean particle diameter $d_{50}$ is the diameter above and below which in each case 50 wt. % of the particles lie, and may be determined by means of ultracentrifuge measurements (W. Scholtan, H. Lange, Kolloid, Z. and Z. Polymere 250 (1972), 782–796).

The component B may be contained in the composition according to the invention in an amount of preferably 1 to 94.9 wt. %, particularly preferably 2 to 40 wt. % and most particularly preferably 5 to 25 wt. %, referred to the weight of the composition.

Component C

The compositions according to the invention contain as flame-proofing agents oligomeric organic phosphoric acid esters based on bisphenol A or based on bisphenolic compounds similar thereto. These compounds have the following formula

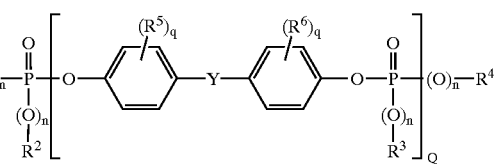

in which the radicals $R^1$, $R^2$, $R^3$ and $R^4$ independently of one another denote $C_1$ to $C_8$ alkyl optionally substituted by halogen, or $C_5$ to $C_6$ cycloalkyl, $C_6$ to $C_{10}$ aryl or $C_7$ to $C_{12}$ aralkyl in each case optionally substituted by halogen and/or alkyl, n independently of one another is 0 or 1, q independently of one another is 0, 1, 2, 3 or 4, Q is 0.5 to 30, preferably 0.7 to 15, in particular 0.9 to 5, $R^5$ and $R^6$ independently of one another denote $C_1$ to $C_4$ alkyl, preferably methyl, or halogen, preferably chlorine and/or bromine, and Y denotes $C_1$ to $C_7$ alkylidene, $C_1$ to $C_7$ alkylene, $C_5$ to $C_{12}$ cycloalkylene, $C_5$ to $C_{12}$ cycloalkylidene, —O—, —S—, —SO—, —$SO_2$— or —CO—.

The suitable phosphorus compounds according to the invention for component C are generally known (see for example Ullmanns Enzyklopädie der Technischen Chemie, Vol. 18, p. 301 et seq. 1979; Houben-Weyl, Methoden der Organischen Chemie, Vol. 12/1, p. 43; Beilstein, Vol. 6, p. 177).

Preferred substituents $R^1$ to $R^4$ include methyl, butyl, octyl, chloroethyl, 2-chloro-propyl, 2,3-dibromopropyl, phenyl, cresyl, cumyl, naphthyl, chlorophenyl, bromophenyl, pentachlorophenyl and pentabromophenyl. Particularly preferred are methyl, ethyl, butyl, phenyl and naphthyl.

The aromatic groups $R^1$, $R^2$, $R^3$ and $R^4$ may be substituted by halogen and/or $C_1$ to $C_4$ alkyl. Particularly preferred aryl radicals are cresyl, phenyl, xylenyl, propylphenyl or butylphenyl, as well as also the brominated and chlorinated derivatives thereof.

$R^5$ and $R^6$ preferably denote, independently of one another, methyl or bromine.

Y preferably denotes $C_1$ to $C_7$ alkylene, in particular isopropylidene or methylene, —$SO_2$— or $C_5$ to $C_{12}$ cycloalkylene.

n may have a value from 0 to 1. Preferably n is equal to 1.

q may be 0, 1, 2, 3 or 4, and is preferably 0, 1 or 2; particularly preferably q=0.

Q may have values of 0.5 to 30, preferably 0.7 to 15, in particular 0.9 to 5. As component C according to the invention there may also be used mixtures of different phosphates. In this case Q has an average value in the aforementioned intervals and preferred ranges. This mixture may also contain monophosphorus compounds (Q=0).

The mean Q values may be found by determining the composition of the phosphate mixture (molecular weight distribution) by means of suitable methods (gas chromatography (GC), high pressure liquid chromatography (HPLC) or gas permeation chromatography (GPC)) and calculating therefrom the mean values for Q.

The component C may be contained in the composition according to the invention in an amount of preferably 0.01 to 40 wt. %, in particular 1 to 25 wt. %, particularly preferably 2 to 20 wt. %, referred to the weight of the composition.

Component D

The flame-proofing agent component C according to the invention is used in combination with so-called anti-drip agents that reduce the tendency of the material to form burning droplets in the event of a fire. By way of example there may be mentioned here compounds of the classes of substances comprising fluorinated polyolefins, silicones as well as aramide fibres. These may also be used in the compositions according to the invention. Preferably fluorinated polyolefins are used as anti-drip agents in the compositions according to the invention.

Fluorinated polyolefins are known and are described for example in EP-A 0 640 655. Suitable ones are marketed under the trade name Teflon® 30N by DuPont.

The fluorinated polyolefins may be used in pure form as well as in the form of a coagulated mixture of emulsions of the fluorinated polyolefins with emulsions of the graft polymers (component B) or with an emulsion of a copolymer, preferably based on styrene/acrylonitrile, the fluorinated polyolefin being mixed as an emulsion with an emulsion of the graft polymer or of the copolymer and then coagulated.

Furthermore the fluorinated polyolefins may be used as a precompound with the graft polymer (component B) or with a copolymer, preferably based on styrene/acrylonitrile. The fluorinated polyolefins are mixed as a powder with a powder or granules of the graft polymer or copolymer and are compounded in the melt generally at temperatures of 200° to 330° C. in conventional units such as internal kneaders, extruders or double-shaft screw extruders.

The fluorinated-polyolefins may also be used in the form of a master batch that is produced by emulsion polymerization of at least one monoethylenically unsaturated monomer in the presence of an aqueous dispersion of the fluorinated polyolefin. Preferred monomer components include styrene, acrylonitrile and their mixtures. The polymer is used as a flowable powder after acid precipitation and subsequent drying.

The coagulates, pre-compounds or master batches normally have solids contents of fluorinated polyolefin of 5 to 95 wt. %, preferably 7 to 60 wt. %.

Anti-drip agents (component D) may be contained in the compositions according to the invention preferably in amounts of 0.01 to 5 wt. %, more preferably 0.01 to 2 wt. %, and particularly preferably 0.1 to 0.5 wt. %, referred to the weight of the composition.

Component E

As component E the compositions according to the invention contain at least one polyhydroxy ether. Preferred polyhydroxy ether may be obtained by reacting at least one aliphatic or aromatic diol with an epihalogen hydrin. Preferred compositions according to the invention contain 0.01 to 10 wt. % of the component E. Particularly preferably the component E is contained in the polymer compositions according to the invention in amounts of 0.05 to 5 wt. %, in particular 0.1 to 3 wt. %. The aforementioned percentage figures in each case relate to the weight of the polymer composition.

The polyhydroxy ethers that may be used as component E are for example condensation products of aliphatic or aromatic diols with an epihalogen hydrin. Preferred aliphatic diols are those with 2 to 10 C atoms, for example 1,2-propanediol, 1,3-propanediol, 1,4-butanediol, 2,4-pentanediol, 1,5-pentanediol, 1,2,-hexanediol, 1,5-hexanediol or 1,6-hexanediol. Particularly suitable aromatic diols are diphenols of the formula (I). Bisphenol A (2,2-di-(4-hydroxyphenyl)propane) is particularly preferably used.

Epichlorohydrin in particular is used as epihalogen hydrin. There are particularly preferably used as component E polyhydroxy ethers produced by reacting bisphenol A with epichlorohydrin. Particularly preferred examples of component E also include polyhydroxy ethers based on bisphenol S (di-4,4'-hydroxyphenylsulfone).

A particularly preferred polyhydroxy ether is one containing the repeating unit of the general formula (IV)

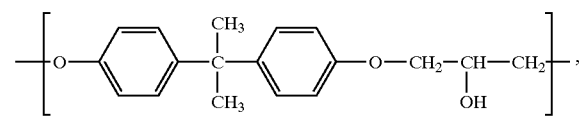

(IV)

Suitable terminal groups are for example hydrogen, halogen or organic radicals.

The polyhydroxy ethers generally have molecular weights (weight average molecular weight $M_w$ determined by gel permeation chromatography) in the range from 10,000 to 150,000 g/mole, preferably 15,000 to 120,000 g/mole.

The polyhydroxy ethers E are known per se or can be produced by known methods, and are commercially available. Examples of polyhydroxy ethers that can be used according to the invention are, inter alia, the polyhydroxy ethers described in EP O 780 438 A3.

Component F

The component F comprises one or more thermoplastic vinyl (co)polymers F.1 and/or polyalkylene terephthalates F.2.

Suitable as vinyl (co)polymers F.1 are polymers of at least one monomer from the group comprising vinyl aromatic compounds, vinyl cyanides (unsaturated nitriles), (meth) acrylic acid ($C_1$ to $C_8$) alkyl esters, unsaturated carboxylicacids as well as derivatives (such as anhydrides and imides) of unsaturated carboxylic acids. Particularly suitable are (co)polymers of F.1.1 50 to 99 parts by weight, preferably 60 to 80 parts by weight of vinyl aromatic compounds and/or nuclear-substituted vinyl aromatic compounds such as for example styrene, α-methylstyrene, p-methylstyrene, p-chlorostyrene, and/or methacrylic acid ($C_1$ to $C_8$) alkyl esters such as methyl methacrylate, ethyl methacrylate, and F.1.2 1 to 50 parts by weight, preferably 20 to 40 parts by weight of vinyl cyanides (unsaturated nitriles) such as acrylonitrile and methacrylonitrile and/or (meth)acrylic acid ($C_1$–$C_8$) alkyl esters (such as methyl methacrylate, n-butyl acrylate, tert.-butyl acrylate) and/or unsaturated carboxylic acids (such as maleic acid) and/or derivatives (such as anhydrides and imides) of unsaturated carboxylic acids (for example maleic anhydride and N-phenyl-maleimide).

The (co)polymers F.1 are resin-like, thermoplastic and rubber-free.

Particularly preferred is the copolymer of F.1.1 styrene and F.1.2 acrylonitrile.

The (co)polymers according to F.1 are known and may be produced by free-radical polymerization, in particular by emulsion, suspension, solution or bulk polymerization. The (co)polymers preferably have molecular weights $M_w$ (weight average, determined by light scattering or sedimentation) of between 15,000 and 200,000.

The polyalkylene terephthalates of component F.2 are reaction products of aromatic dicarboxylic acids or their reactive derivatives, such as dimethyl esters or anhydrides, and aliphatic, cycloaliphatic or araliphatic diols as well as mixtures of these reaction products.

Preferred polyalkylene terephthalates contain at least 80 wt. %, preferably at least 90 wt. %, referred to the dicarboxylic acid component, of terephthalic acid radicals, and at least 80 wt. %, preferably at least 90 mole %, referred to the diol-component, of ethylene glycol radicals and/or butanediol-1,4 radicals.

The preferred polyalkylene terephthalates may contain, in addition to terephthalic acid radicals, also up to 20 mole %, preferably up to 10 mole %, of radicals of other aromatic or cycloaliphatic dicarboxylic acid, with 8 to 14 C atoms or aliphatic dicarboxylic acids with 4 to 12 C atoms, such as for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may contain, in addition to ethylene glycol radicals or butanediol-1,4 radicals, also up to 20 mole %, preferably up to 10 mole %, of other aliphatic diols with 3 to 12 C atoms or cycloaliphatic diols with 6 to 21 C atoms, for example radicals of propanediol-1,3, 2-ethylpropanediol-1,3, neopentyl glycol, pentanediol-1,5, hexanediol-1,6, cyclohexanedimethanol-1,4, 3-ethylpentanediol-2,4, 2-methylpentanediol-2,4, 2,2,4-trimethylpentanediol-1,3, 2-ethylhexanediol-1,3, 2,2-diethylpropanediol-1,3, hexanediol-2,5, 1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(4-β-hydroxyethoxyphenyl)-propane and 2,2-bis-(4-hydroxypropoxyphenyl)-propane (DE-A 2 407 674, 2 407 776, 2 715 932).

The polyalkylene terephthalates may be branched by incorporating relatively small amounts of trihydric or tetrahydric alcohols or tribasic or tetrabasic carboxylic acids, for example according to DE-A 1 900 270 and U.S. Pat. No. 3,692,744. Examples of preferred branching agents are trimesic acid, trimellitic acid, trimethylolethane and trimethylolpropane, and pentaerythritol.

Particularly preferred are polyalkylene terephthalates that have been produced simply from terephthalic acid and its reactive derivatives (for example its dialkyl esters) and ethylene glycol and/or butanediol-1,4, and mixtures of these polyalkylene terephthalates.

Mixtures of polyalkylene terephthalates contain 1 to 50 wt. %, preferably 1 to 30 wt. %, of polyethylene terephthalate, and 50 to 99 wt. %, preferably 70 to 99 wt. %, of polybutylene terephthalate.

The polyalkylene terephthalates that are preferably used generally have an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscosimeter.

The polyalkylene terephthalates may be produced by methods known per se (see for example Kunststoff-Hanbuch, Vol. VIII, p. 695 et seq, Carl-Hanser-Verlag, Munich 1973).

The component F may be contained in the composition according to the invention in any amount, preferably 0.1 to 60 wt. %, particularly preferably 1 to 40 wt. % and most particularly preferably 1 to 30 wt. %, referred to the weight of the composition.

Component G

The component G comprises very finely particulate inorganic powders.

The very finely particulate inorganic powders G that may be used according to the invention preferably consist of at least one or more metals of main groups I to V or sub-groups I to VII of the Periodic System, preferably main groups II to V or sub-groups IV to VIII, particularly preferably main groups III to V or sub-groups IV to VIII, or of compounds of these metals with at least one element selected from oxygen, hydrogen, sulfur, phosphorus, boron, carbon, nitrogen or silicon.

Preferred compounds are for example oxides, hydroxides, water-containing oxides, sulfates, sulfites, sulfides, carbonates, carbides, nitrates, nitrites, nitrides, borates, silicates, aluminosilicates, phosphates, hydrides, phosphites or phosphonates.

The very finely particulate inorganic powders are preferably oxides, phosphates, hydroxides, preferably $TiO_2$, $SiO_2$, $SnO_2$, ZnO, ZnS, boehmite, $ZrO_2$, $Al_2O_3$, aluminum phosphates, as well as TiN, WC, $Sb_2O_3$, iron oxides, $Na_2SO_4$, vanadium oxides, zinc borate, silicates and aluminum silicates, in particular Mg or Ca silicates, or one-dimensional, two-dimensional or three-dimensional silicates. Mixtures and doped compounds may also be used.

Furthermore these nano-scale particles may be surface-modified with organic molecules in order to achieve a better compatibility with the polymers. Hydrophobic or hydrophilic surfaces can be produced in this way.

Particularly preferred are titanium dioxide and hydrate-containing aluminum oxides such as boehmite.

Also preferred are mineral silicate compounds such as talcum or wollastonite.

The average particle diameters of the very finely particulate powders are less than 2000 nm, preferably less than 1000 nm, and in particular less than 500 nm.

The terms particle size and particle diameter always denote the mean largest particle diameter $d_{50}$ determined for example by ultracentrifuge measurements according to W. Scholtan et al., Kolloid-Z. und Z. Polymere 250 (1972), pp. 782–796 or by sedimentation.

The inorganic powder is preferably incorporated into the thermoplastic polymer composition in amounts of up to 5 wt. %, preferably 0.01 to 2 wt. %, particularly preferably 0.01 to 1 wt. %, referred to the thermoplastics material.

According to a preferred embodiment of the invention boehmite or talcum with a mean particle size of less than about 2000 nm is used as very finely divided inorganic powder.

The inorganic compounds may be present as powders, pastes, sols, dispersions or suspensions. Powders may be obtained from dispersions, sols or suspensions by precipitation.

The powders may be incorporated into the thermoplastic polymer compositions by conventional methods, for example by direct kneading or extrusion of polymer compositions and the very finely divided inorganic powders.

Component H

The polymer compositions according to the invention may contain up to 20 wt. %, preferably 0.01 to 10 wt. %, referred to the weight of the composition, of at least one of the conventional polymer additives such as lubricants and mold release agents, for example pentaerythritol tetrastearate, nucleating agents, antistatics, stabilizers, fillers and reinforcing agents, as well as dyes and pigments.

The polymer compositions according to the invention may contain up to 20 wt. %, referred to the total polymer composition, of a further, optionally synergistically acting flame-proofing agent. Examples of further flame-proofing agents that may be mentioned include organic halogen compounds such as decabromobisphenyl ether, tetrabromobisphenol A, inorganic halogen compounds such as ammonium bromide, nitrogen compounds such as melamine, melamine-formaldehyde resins, inorganic hydroxide compounds such as Mg hydroxide, Al hydroxide, inorganic compounds such as antimony oxides, barium metaborate, hexahydroxoantimonate, zirconium oxide, zirconium hydroxide, molybdenum oxide, ammonium molybdate, zinc borate, ammonium borate, barium metaborate, talcum, wollastonite, mica, silicon oxide and tin oxide, as well as siloxane compounds. As additional flame-proofing agents there may furthermore also be used oligophosphates or monomeric organic phosphoric acid esters or phosphorate amines or phosphazines different from component C.

The sum of the percentages by weight of all the constituents contained in the compositions totals 100.

The polymer compositions according to the invention containing the components A to E and optionally further components are produced by mixing the respective constituents in a known manner and melt-compounding and melt-extruding the mixtures at temperatures of 200° C. to 300° C. in conventional units such as internal kneaders, extruders and double-shaft screw extruders.

The mixing of the individual constituents may be carried out in a known manner both successively as well as simultaneously, and more specifically at about 20° C. (room temperature) as well as at higher temperatures.

The present invention accordingly also provides a process for the production of the polymer compositions.

The polymer compositions according to the invention may be used to produce all types of molded articles. These may be produced by injection molding, extrusion and blow molding processes. A further form of processing is the production of molded bodies by thermoforming from previously fabricated sheets or films.

Examples of such molded articles include films, profiled sections, all types of housing parts, e.g. for domestic appliances such as juice presses, coffee-making machines, mixers; for office equipment such as monitors, printers, copiers; sheets, tubing, electrical installation ducting, window profiles, door profiles and other profiles for the building and construction sector (internal and external applications) as well as electrical and electronics parts such as switches, plugs and sockets.

In particular the polymer compositions according to the invention may be used for example to produce the following molded articles or molded parts:

internal structural parts for rail vehicles, ships, aircraft, buses and other vehicles, housings for electrical equipment containing small transformers, housings for equipment for information processing and transmission, housings and casings for medical equipment, massage equipment and housings therefor, two-dimensional wall units, housings for safety devices, and thermally insulated transporting containers.

The present invention accordingly also provides for the use of the polymer compositions according to the invention for the production of all types of molded articles, preferably those mentioned above, as well as the molded articles produced from the polymer compositions according to the invention.

The invention is described in more detail hereinafter with the aid of working examples.

EXAMPLES

Three polycarbonate compositions corresponding to the specifications in Table 1 were produced and processed further into test specimens and then tested.

Component A

Linear polycarbonate based on bisphenol A with a relative solution viscosity of 1.25 measured in $CH_2Cl_2$ as solvent at 25° C. and at a concentration of 0.5 g/100 ml.

Component B

Graft polymer of 84 parts by weight of a copolymer of styrene and acrylonitrile in a ratio of 73:27 on 16 parts by weight of crosslinked polybutadiene rubber produced by bulk polymerization.

Component C

Oligophosphate based on bisphenol A

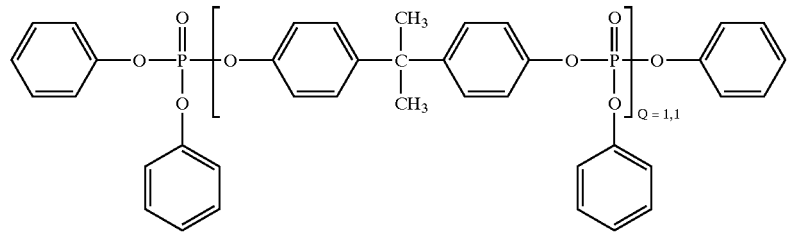

Component D

Tetrafluoroethylene polymer as a coagulated mixture of an aqueous emulsion of a graft polymer of about 40 parts by weight of a copolymer of a styrene and acrylonitrile in a ratio of 73:27 on 60 parts by weight of particulate crosslinked polybutadiene rubber (mean particle diameter $d_{50}=0.3$ μm) produced by emulsion polymerization, and a tetrafluoroethylene polymer emulsion in water. The weight ratio of graft polymer to tetrafluoroethylene polymer in the mixture is 90 wt. % to 10 wt. %. The tetrafluoroethylene polymer emulsion had a solids content of 60 wt. %, and the mean particle diameter was between 0.05 and 0.5 μm. The SAN-graft polymer emulsion had a solids content of 34 wt. %.

The emulsion of the tetrafluoroethylene polymer (Teflon® 30 N from DuPont, USA) is mixed with the emulsion of the SAN graft polymer and is stabilized with 1.8 wt. %, referred to polymer solids, of phenolic antioxidants. The mixture is coagulated at 85° to 95° C. with an aqueous solution of $MgSO_4$ (Epsom salts) and acetic acid at pH 4 to 5, filtered and washed until practically free of electrolyte, and is then freed from most of the water by centrifugation and finally dried at 100° C. to form a powder.

Component E

YP-50: polyhydroxy ether/phenoxy resin produced from bisphenol A and epichlorohydrin with a molecular weight $M_w$ of 56,500 and an $M_w/M_n$ ratio of 5.38 (Tohto Kasei Co., Ltd., Tokyo, Japan).

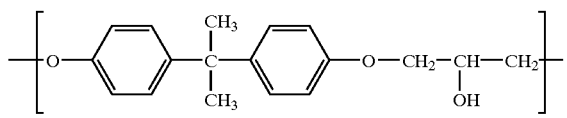

Component H1

Pentaerythritol tetrastearate as mold release agent.

Component H2

Phosphite stabilizer.

Production and Testing of the Polymer Compositions according to the Invention

The mixing of the components of the compositions is carried out in a ZSK 25 mixer (Werner/Pfleiderer). The molded articles were produced in an Arburg 270 E type injection molding machine at 240° C.

The fracture pattern (ductility) of the molding composition is determined in an impact test using notched test specimens according to the instructions given in ISO 180-1 A.

The measurement of the Vicat B thermal stability is carried out according to DIN 53 460 (ISO 306) on specimens measuring 80 mm×10 mm×4 mm.

The melt viscosity is determined at 260° C. and at a shear rate of 1,000 s$^{-1}$ according to DIN 54811.

The stress crack behavior (ESC behavior) was investigated on specimens of dimensions 80 mm×10 mm×4 mm. A mixture of 60 vol. % of toluene and 40 vol. % of isopropanol is used as test medium. The test specimens were pre-stretched by means of an arcuate template, the extension being 2.4%, and are stored in the test medium at room temperature. The stress crack behavior is evaluated on the basis of the time taken for the test specimen to fracture.

The fire behavior of the samples is evaluated in the UL 94 V flame resistance test using rods of dimensions 127 mm×12.7 mm×1.2 mm. The overall afterburn time, which must not exceed 50 seconds in order to achieve a "V0" evaluation, is measured.

TABLE 1

| Molding Composition/Components | V1 | 1 | 2 |
|---|---|---|---|
| A (polycarbonate) | 66.4 | 66.4 | 66.4 |
| B (graft polymer) | 16.1 | 16.1 | 16.1 |
| C (oligophosphate) | 12.5 | 12.5 | 12.5 |
| D (anti-drip agent) | 4.5 | 4.5 | 4.5 |
| E (polyhydroxy ether) | — | 0.5 | 1.5 |

TABLE 1-continued

| Molding Composition/Components | V1 | 1 | 2 |
|---|---|---|---|
| H1 (additive) | 0.4 | 0.4 | 0.4 |
| H2 (additive) | 0.1 | 0.1 | 0.1 |
| Properties: | | | |
| Fracture pattern in the impact test according to ISO 180-1 A | ductile | ductile | ductile |
| Vicat B 120 [° C.] | 98 | 98 | 98 |
| Melt viscosity (260° C./1000s$^{-1}$) [Pas] | 161 | 160 | 149 |
| ESC (time until fracture at $\epsilon_x$ = 2.4%) [min.] | 12 | 18 | 27 |
| Overall afterburn time in the UL94 V test at 1.2 mm | 78 | 62 | 47 |
| Overall afterburn time in the UL94 V test at 1.6 mm | 10 | 9 | 10 |

At a wall thickness of 1.5 mm the molding compositions 1 and 2 according to the invention both satisfy the requirements for a V0 evaluation in the UL94 V test.

The results given in the lower part of Table 1 show that the polymer compositions 1 and 2 according to the invention have a significantly improved ESC behavior, a shorter overall afterburn time in the UL94 V test, as well as an improved flowability (expressed by the melt viscosity) compared to the comparison composition V1, which does not contain polyhydroxy ether. The results of the impact test according to ISO 180-1 A show furthermore that the ductility of the compositions 1 and 2 according to the invention remain good, despite the addition of polyhydroxy ether. The results of the Vicat B test show moreover that the polyhydroxy ether has no plasticizing effect as regards the thermal stability.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (A) at least one aromatic polycarbonate and/or polyester carbonate,
   (B) at least one graft polymer,
   (C) at least one oligophosphate of the general formula

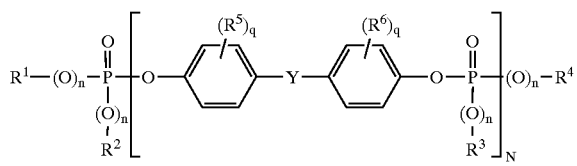

in which the radicals
   $R^1$, $R^2$, $R^3$ and $R^4$ independently of one another denote a member selected from the group consisting of $C_1$ to $C_8$ alkyl, $C_5$ to $C_6$ cycloalkyl, $C_6$ to $C_{10}$ aryl and $C_7$ to $C_{12}$ aralkyl,
   n independently of one another is 0 or 1,
   q independently of one another is 0, 1, 2, 3 or 4,
   N is 0.5 to 30,
   $R^5$ and $R^6$ independently of one another denote $C_1$ to $C_4$ alkyl or halogen, and
   Y denotes a member selected from the group consisting of $C_1$ to $C_7$ alkylidene, $C_1$ to $C_7$ alkylene, $C_5$ to $C_{12}$ cycloalkylene, $C_5$ to $C_{12}$ cycloalkylidene, —O—, —S—, —SO—, —SO$_2$— and —CO—, (D) at least one anti-drip agent and (E) at least one polyhydroxy ether.

2. The composition according to claim 1, wherein (A) is contained in an amount of 5 to 98.9 wt. % based on the total composition.

3. The composition according to claim 1, wherein (A) is contained in an amount of 10 to 90 wt. % based on the total composition.

4. The composition according to claim 1, wherein (A) is contained in an amount of 40 to 80 wt. % based on the total composition.

5. The composition according to claim 1 wherein (B) is contained in an amount of 1 to 94.9 wt. % based on the total composition.

6. The composition according to claim 1 wherein (B) is contained in an amount of 2 to 40 wt. % based on the total composition.

7. The composition according to claim 1 wherein (B) is a graft polymer of 5 to 95 wt. % of at least one vinyl monomer on 95 to 5 wt. % of at least one graft base with a glass transition temperature of less than about 10° C.

8. The composition according to claim 7, wherein the graft base is a member selected from the group consisting of diene, EP(D)M, acrylate and silicone rubbers.

9. The composition according to claim 7 wherein the graft polymer is at least one of emulsion ABS and bulk ABS.

10. The composition according to claim 1 wherein (C) is contained in an amount of 0.01 to 40 wt. % based on the total composition.

11. The composition according to claim 1 wherein (C) is contained in an amount of 1 to 25 wt. % based on the total composition.

12. The composition according to claim 1 wherein (D) is contained in an amount of 0.01 to 5 wt. % based on the total composition.

13. The composition according to claim 1 wherein (D) is contained in an amount of 0.01 to 2 wt. % based on the total composition.

14. The composition according to claim 1 wherein (D) is at least one member selected from the group consisting of polytetrafluoroethylene, polyvinylidene fluoride or tetrafluoro-ethylene/hexafluoropropylene copolymers and ethylene/tetrafluoroethylene copolymers.

15. The composition according to claim 1 wherein (E) is contained in an amount of 0.01 to 10 wt. % based on the total composition.

16. The composition according to claim 1 wherein (E) is contained in an amount of 0.05 to 5 wt. % based on the total composition.

17. The composition according to claim 1 wherein (E) is contained in an amount of 0.1 to 3 wt. % based on the total composition.

18. The composition according to claim 1 wherein the polyhydroxy ether contains a repeating unit of formula (IV)

(IV)

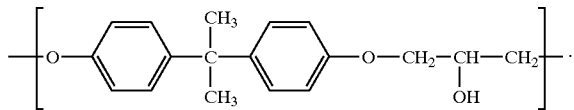

19. The composition according to claim 1 further containing (F) at least one member selected from the group consisting of thermoplastic vinyl (co)polymer and polyalkylene terephthalate.

20. The composition according to claim 1 further containing (G) a particulate inorganic powder having a mean particle size of less than about 2000 nm.

21. The composition according to claim 20 wherein inorganic powder is a member selected from the group consisting of boehmite and talcum.

22. The composition according to claim 1 further containing (H) at least one additive selected from the group consisting of lubricants, mold release agents, nucleating agents, antistatics, stabilizers, fillers, reinforcing agents, dyes and pigments.

23. A method of using the composition according to claim 1 comprising molding it into an article.

24. The molded article prepared by the method of claim 23.

* * * * *